United States Patent [19]

Marchionda et al.

[11] Patent Number: 5,791,563
[45] Date of Patent: Aug. 11, 1998

[54] GAS BURNER HAVING A FIXED HEAD BURNER WITH A QUARTZ NOZZLE, A SPRING AND AN END CAP

[75] Inventors: John Paul Marchionda; Teddy Breece Paisley, II, both of Roanoke, Va.

[73] Assignee: Alcatel NA Cable Systems, Inc., Claremont, N.C.

[21] Appl. No.: 933,153

[22] Filed: Sep. 18, 1997

Related U.S. Application Data

[63] Continuation of Ser. No. 796,658, Feb. 5, 1997, abandoned, and Ser. No. 384,035, Feb. 6, 1995, abandoned.

[51] Int. Cl.⁶ .................................................... B05B 7/06
[52] U.S. Cl. ........................ 239/424.5; 239/430; 239/550; 239/DIG. 19
[58] Field of Search ........................ 239/423, 424, 239/424.5, 425, 430, 536, 550, DIG. 19; 65/120, 244, 271

[56] References Cited

U.S. PATENT DOCUMENTS

| | | | |
|---|---|---|---|
| 2,713,894 | 7/1955 | Sage | 158/99 |
| 3,156,292 | 11/1964 | Ross | 158/114 |
| 3,409,233 | 11/1968 | Kiernan | 239/556 |
| 3,648,932 | 3/1972 | Ewald et al. | 239/425.5 X |
| 3,847,355 | 11/1974 | Smith | 239/424.5 |
| 3,876,149 | 4/1975 | Futerko | 239/398 |
| 4,081,136 | 3/1978 | Addoms et al. | 239/127.1 |
| 4,231,777 | 11/1980 | Lynch et al. | 65/109 |
| 4,270,702 | 6/1981 | Nicholson | 239/455 |
| 4,401,267 | 8/1983 | Spainhour | 239/132.3 |
| 4,415,123 | 11/1983 | Ikeuchi | 239/425 |
| 4,477,244 | 10/1984 | Nis et al. | 432/11 |
| 4,645,451 | 2/1987 | Schneider et al. | 431/278 |
| 4,913,648 | 4/1990 | Clavell | 239/428 X |
| 5,160,520 | 11/1992 | Keim et al. | 65/2 |
| 5,169,422 | 12/1992 | D'Annessa et al. | 65/3.12 |
| 5,255,854 | 10/1993 | Keim et al. | 239/556 |

FOREIGN PATENT DOCUMENTS

| | | |
|---|---|---|
| 2132968 | 1/1972 | Germany. |
| 495322 | 10/1952 | Italy. |
| 881770 | 11/1961 | United Kingdom. |

OTHER PUBLICATIONS

Catalogue page from German company Herbert Arnold showing "Hand Blown Glass Nozzles".

*Primary Examiner*—Lee W. Young
*Attorney, Agent, or Firm*—Ware, Fressola, Van Der Sluys & Adolphson LLP

[57] ABSTRACT

In a fixed head burner (13), which may be used in the manufacture of optical fibers and preforms for optical fibers, a machined quartz nozzle (10) is provided for insertion into a threaded aperture (14) of the fixed burner head (13), the quartz nozzle (10) being sized to provide sufficient space between the quartz nozzle (10) and the burner head (12) to allow for relative differences in thermal expansion and contraction to prevent stress fracture of the quartz nozzle (10). A seating surfaces (85) is machined on the quartz nozzle (10) for contact with a machined surface (90) of the burner head (12), and the quartz nozzle is held in place by a spring (18) placed behind the quartz nozzle (10), the spring (18) being held in place by a threaded end cap (24). The secure retention of the quartz nozzle (10) within an aperture (14) in the burner head (12) is further aided by the pneumatic pressure of gases applied to a rear surface (20) of the quartz nozzle (10). During exposure to high temperatures, erosion of the quartz nozzle (10) may occur, however, the erosion by-products do not contaminate a preform or an optical fiber being heated by the burner head (12).

10 Claims, 4 Drawing Sheets

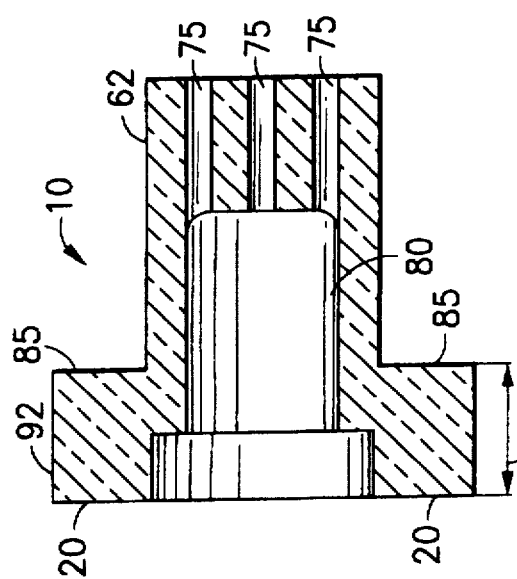
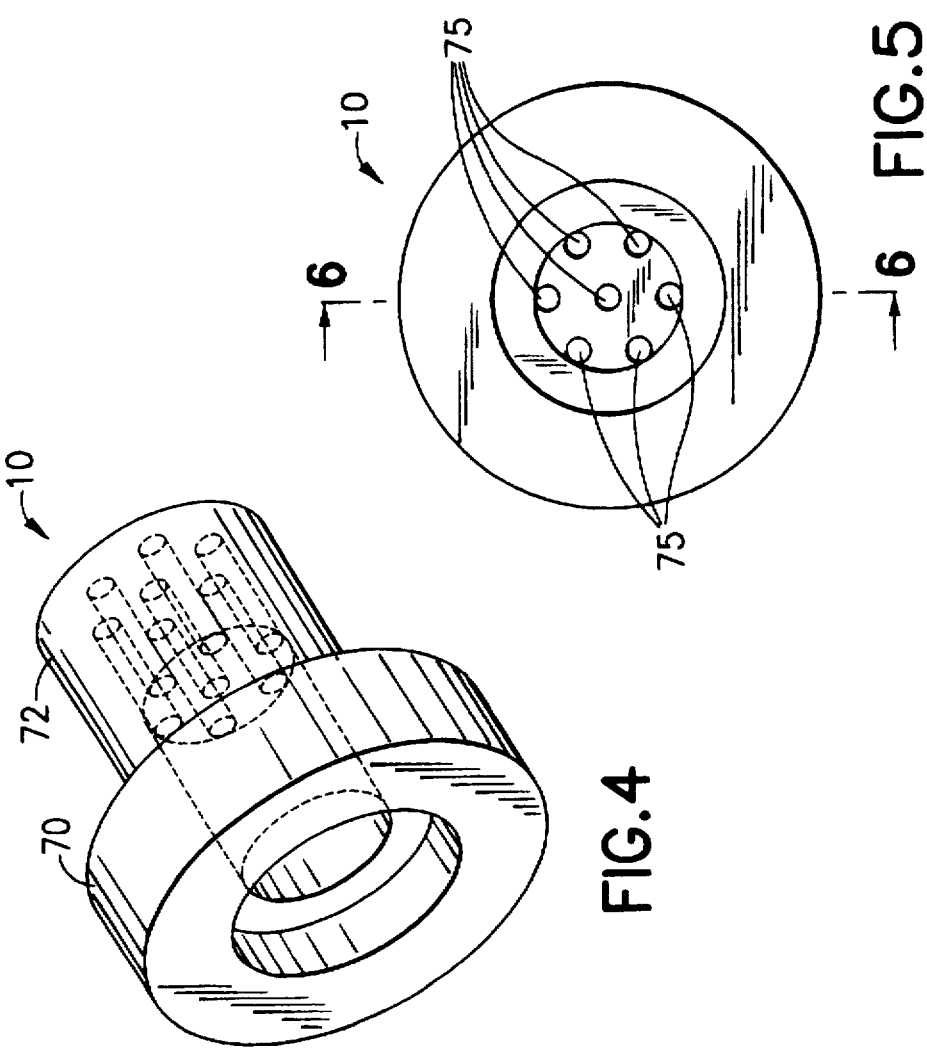

GAS BURNER HAVING A FIXED HEAD BURNER WITH A QUARTZ NOZZLE, A SPRING AND AN END CAP

This application is a continuation of application Ser. No. 08/384,035 filed on Feb. 6, 1995 and Ser. No. 08/796,658 filed on Feb. 5, 1997, both now abandoned.

TECHNICAL FIELD

The present invention relates to a burner head for gas burners, and more particularly, to improved outlet nozzles for the burner head.

BACKGROUND OF THE INVENTION

Numerous types of gas burners or torches have been used for a long time in various industries because of the high operating temperatures which can be achieved when a burner head of the gas burner is supplied with appropriate combustible gases, for example, hydrogen and oxygen. One important application of gas burners is the manufacture of optical fibers.

One application of gas burners during the manufacturing of optical fibers is sleeving. During this optical fiber manufacturing step, a fiber optic rod (preform) is inserted into a quartz tube. The quartz tube is placed in the burner section of a gas burner, and a vacuum is placed on the area between the rod and the quartz tube. The tube is then collapsed onto the preform with the aid of the high temperature of the burner and the vacuum.

A second application of gas burners is during the Modified Chemical Vapor Deposition (MCVD) process which is used to manufacture preforms. A preform manufactured using the MCVD process is used to make single mode optical fiber. During the MCVD process, a core glass material is applied to the inner wall of a glass tube by chemical deposition from the vapor phase. The internally-coated glass tube is then caused to collapse by temperature treatment, thereby forming a preform. The preform may then be drawn out to form an optical fiber. A gas burner is used to heat the glass tube to cause it to collapse after the chemical deposition of the glass core material.

Two types of burner heads are typically used for optical fiber manufacturing: surface (or premix) fixed head burners having metallic nozzles; and independent burners having either metallic or quartz nozzles. A fixed head burner is provided with a plurality of metallic nozzles (typically stainless steel) which are threaded into threaded apertures of the burner head. Oxygen and hydrogen are provided to the nozzles, and when ignited, the high pressure gases exiting the nozzles generate the high temperature environment for treatment of optical fiber preforms. Fixed head burners are typically used in the MCVD process, but may also be used during sleeving.

There are several problems associated with the use of stainless steel nozzles in a fixed head burner. First, during use in high temperature environments, stainless steel nozzles tend to oxidize. During oxidation, stainless steel flakes may break free from the nozzle and become entrapped in the oxygen/hydrogen stream exiting the nozzle and be deposited on the glass surface. These metallic impurities result in a weakened fiber because local stress points, which are subject to fracture, occur at the location of the metallic impurities. Additionally, oxides may build up at the tip of the stainless steel nozzles, thereby reducing the size of the apertures or channels which provide the oxygen/hydrogen mixture. The reduced size apertures cause an increase in the velocity of the gases, and therefore, all of the gases may not be burned when exiting the nozzle. This results in a lower temperature of a preform located within the torch assembly because not all of the hydrogen and oxygen are burned.

The problem of reduced aperture size in the stainless steel nozzles may be increased due to the deposition and build-up of carbon on the stainless steel nozzles. The carbon build-up is primarily due to carbon impurities in the oxygen and hydrogen gases. Another potential source of carbon is from the graphite paddles used in glass working. Because of the oxidation and changes in hydrogen and oxygen flow rate, the stainless steel nozzles must be frequently replaced, e.g., every two to three weeks, thereby increasing operating costs, process variability and also increasing the down time of the torch assembly for nozzle replacement.

During the sleeving process, impurities in the hydrogen/oxygen gas stream due to oxidation products greatly reduces the reliability of an optical fiber because of its susceptibility to fracture at the location of the impurity. To overcome this problem associated with the stainless steel nozzles, quartz nozzles have been developed for use in independent burner heads. These known quartz nozzles are hand blown and are extremely fragile. Such quartz nozzles are not made for use with the fixed head burners described hereinabove with respect to stainless steel nozzles, but rather are used in independent burners having a plurality of independent, articulated nozzles.

The known quartz nozzles are provided with two glass supply lines, one being used to supply oxygen and the other being used to supply hydrogen. These nozzles are mounted to independent burners using a compression fitting having an O-ring. During assembly of such quartz nozzles, they must initially be installed, and then the torch assembly must be operated so that the nozzles may be properly aligned. The alignment process is a tedious and difficult process because of the high temperatures of the nozzles. Additionally, the quartz nozzles of the type described herein are extremely susceptible to breakage at the fragile glass supply lines.

SUMMARY OF THE INVENTION

A primary object of the present invention is to provide a quartz nozzle for use in a burner head of a fixed head gas burner which is high strength, not susceptible to breakage and provides a long life in operation.

A further object of the present invention is to provide a quartz nozzle which maintains a relatively constant flow rate of gases through gas supply apertures formed in the nozzle during prolonged operation.

A still further object of the present invention is to provide a machined quartz nozzle for retrofit application into existing fixed head gas burner.

According to the present invention, a quartz nozzle sized to be received through an open end of a burner head nozzle aperture is provided, the quartz nozzle having a seating and alignment section and a gas supply section with at least one gas supply aperture formed therein. A gas supply chamber is formed in the seating and alignment section in communication with the gas supply aperture, and the quartz nozzle is positioned within the nozzle aperture such that a first combustible gas which is provided to the gas supply chamber passes through the gas supply aperture. The outside diameter of the gas supply section is less than the inside diameter of the nozzle aperture, thereby forming an annular ring therebetween wherein a second combustible gas is provided, and the first and second combustible gases exit the nozzle aperture via a gas outlet aperture. Means are provided for retaining the quartz nozzle within the nozzle aperture and for sealing the nozzle aperture open end. According further to the present invention, the outside diameter of the seating and alignment section is larger than the outside diameter of the gas supply section and slightly less than the inside diameter of the surfaces of the burner head defining the nozzle aperture to allow for relative differences in thermal expansion and contraction therebetween to thereby prevent stress fracture of the quartz nozzle.

According still further to the present invention, the seating and alignment section maintains the alignment between the quartz nozzle and the gas outlet aperture such that the first combustible gas exiting the gas supply aperture is directed through the gas outlet aperture.

In further accord with the present invention, the quartz nozzle is machined, and the seating and alignment section comprises a machined nozzle seating surface for engagement with a machined burner seating surface of the burner head within the nozzle aperture. Secure engagement is provided between the nozzle seating surface and the burner seating surface to prevent the first combustible gas from passing between the quartz nozzle and the nozzle aperture.

In still further accord with the present invention, the nozzle aperture open end comprises internal threads, and an end cap having external threads is provided for threaded engagement with the threads formed in the nozzle aperture. A spring is positioned between the end cap and the quartz nozzle, the spring being compressed when the end cap is received in threaded engagement with the nozzle aperture internal threads, thereby exerting a spring force on the quartz nozzle.

According further to the present invention,k the quartz nozzle is flame polished to minimize locations for the initiation of stress fractures, and the quartz nozzle is annealed for stress relief.

The present invention provides a significant improvement over the prior art by utilizing a machined quartz nozzle within a fixed burner head. The machined quartz nozzle provides a high strength, long life nozzle which is not susceptible to breakage during installation or operation. Additionally, the quartz nozzle maintains tight tolerance of oxygen and hydrogen supply apertures formed in the quartz nozzle so that a consistent gas flow rate may be maintained during operation of the quartz nozzle. Additionally, the oxidation products of a quartz nozzle do not contaminate a fiber or cause local stress points in a fiber which may later lead to a stress fracture in an optical fiber.

The machined quartz nozzles have a longer operating life than existing stainless steel nozzles and are much more damage resistant than known hand blown quartz/glass nozzles. Therefore, the quartz nozzles of the present invention provide a significant operational and economic advantage over prior art nozzles used in the manufacture of optical fibers.

The foregoing and other objects, features and advantages of the present invention will become more apparent in view of the following detailed description of exemplary embodiments thereof as illustrated in the accompanying drawings.

BRIEF DESCRIPTION OF THE DRAWING

FIG. 4 is a perspective view of a quartz nozzle of the present invention, gas supply apertures of the nozzle being shown it phantom;

FIG. 5 is a front view of the quartz nozzle of FIG. 4; and

FIG. 6 is cross sectional view taken along line 6—6 of FIG. 5.

DETAILED DESCRIPTION OF THE INVENTION

A quartz nozzle 10 of the present invention is particularly well suited for retrofit application in existing fixed head burners and for installation in new fixed head burners. The quartz nozzle 10 of the present invention is a high strength and long life nozzle which is not susceptible to breakage or failure. Additionally, the quartz nozzle 10 may be machined to high tolerances which are maintained during the operating life of the quartz nozzle 10.

As stated above, a burner using a quartz nozzle 10 according to the invention can be used for a wide variety of technical areas. A special area of application of a burner head using the quartz nozzle 10 of the invention is in the manufacture of optical fiber, and more particularly in the production of a preform for optical fibers. An example of the temperature treatment of a preform is described in U.S. Pat. No. 5,160,520 to Keim et al. for a Process for the Production of a Blank Mold for Glass Fiber Optical Waveguides, the disclosure of which, and particularly FIGS. 6a, 6b, and 7c and the corresponding description, is incorporated herein by reference.

Figure 1:
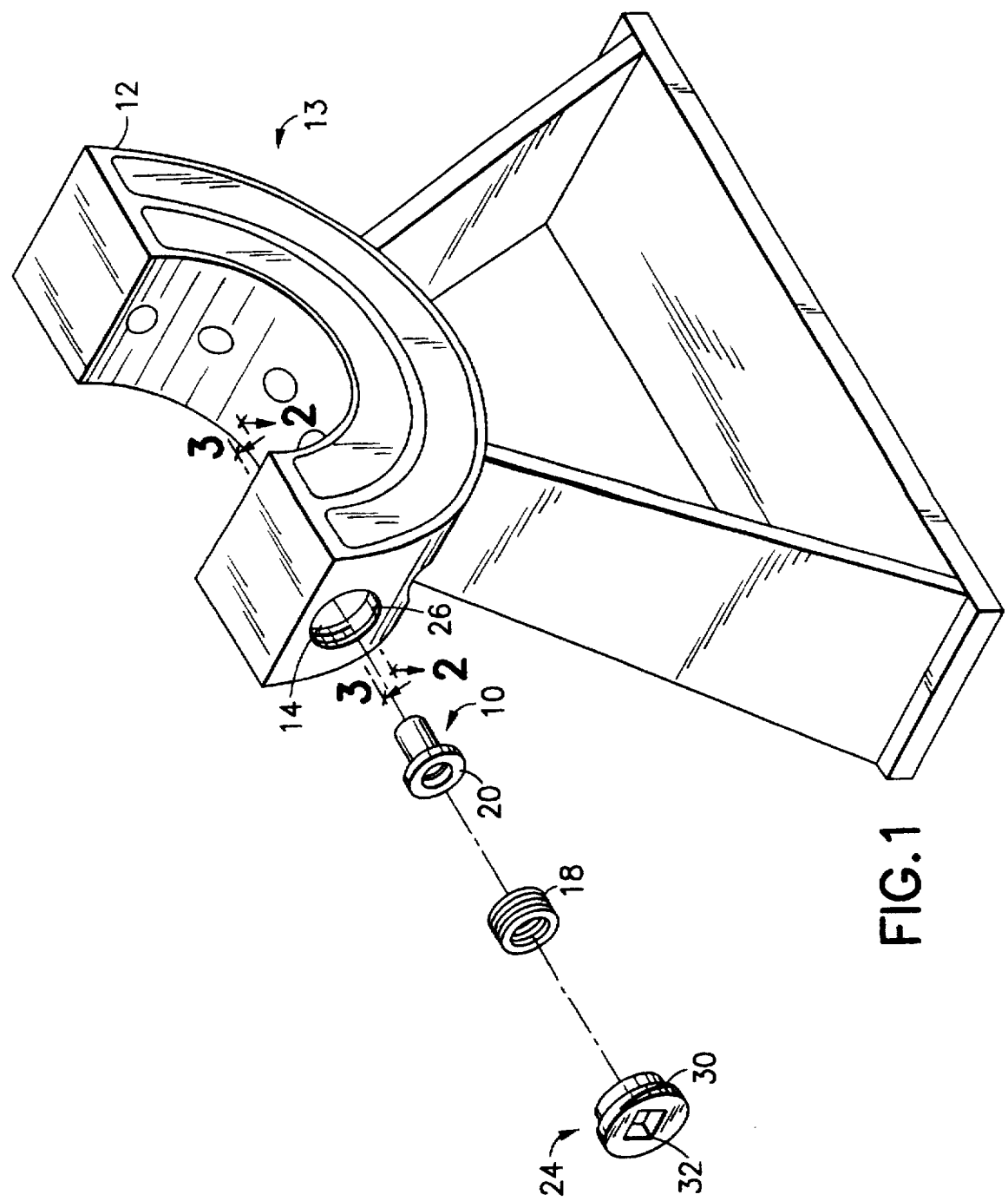
FIG. 1 is an exploded perspective view of a half-shell ring fixed head burner having quartz nozzles of the present invention.

Referring to FIG. 1, a known burner head 12 for a fixed head gas burner 13 is shown. The burner head 12 may be made of a high strength metal such as stainless steel. For purposes of illustrating the quartz nozzle 10 of the present invention, the burner head 12 illustrated in FIG. 1 is a half-shell ring burner 12. However, it will be understood by those skilled in the art that the quartz nozzle 10 of the present invention may be used with any fixed head burner configuration which was previously used with stainless steel nozzles.

Referring again to FIG. 1, a plurality of threaded apertures 14 are formed through the burner head 12 for receiving the quartz nozzles 10. A spring 18 is provided for applying a spring pressure to a rear surface 20 of the quartz nozzle 10, and a threaded end cap 24 is provided for threaded engagement with threads 26 of the aperture 14 for retaining the nozzle 10 and spring 18 within the aperture 14. The spring 18 and end cap 24 may be made of a high strength metal, such as stainless steel.

Figure 2:
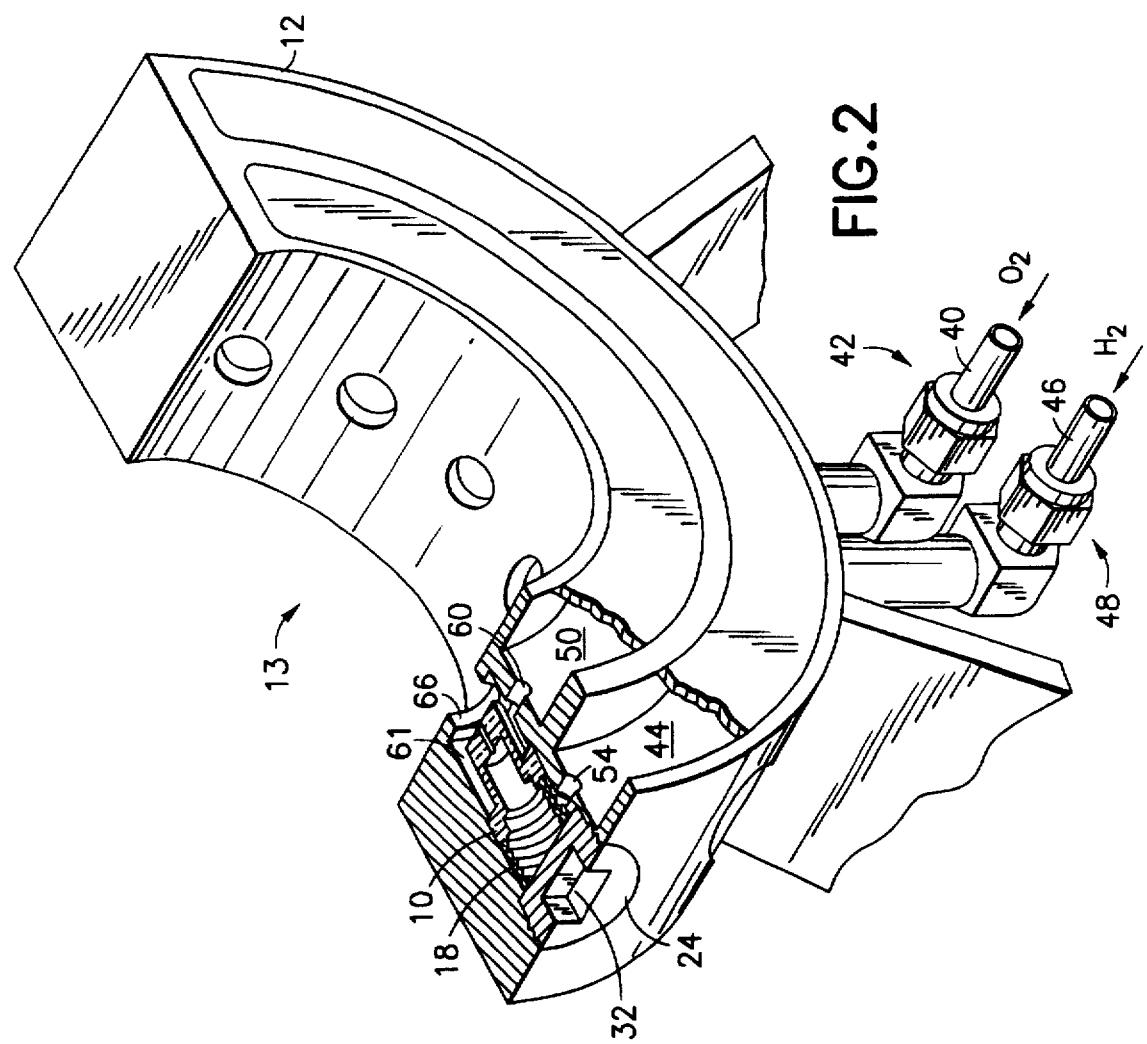
FIG. 2 is a perspective view of the burner of FIG. 1 showing a cross section along line 2—2 of FIG. 1.

In FIG. 2, a more detailed illustration of the burner head of FIG. 1 is shown having a section taken along line 2—2 of FIG. 1. Referring to FIGS. 1 and 2, the quartz nozzle 10 is shown inserted within the aperture 14 of the burner head 12. The spring 18 is received in the aperture 14 behind the quartz nozzle 10, and is compressed against the rear surface 20 of the quartz nozzle 10 by the end cap 24. Threads 30 of the end cap 24 are engaged with the threads 26 of the aperture 14 for securely holding the end cap 24 within the aperture 14 and for sealing the open end of the aperture 14. An operating aperture 32, e.g., a rectangular, square, hexagonal, etc. shaped aperture, may be formed in the end cap 24 for engagement with a tool (not shown) for installation and removal of the end cap 24 within the threaded aperture 14.

Figure 3:
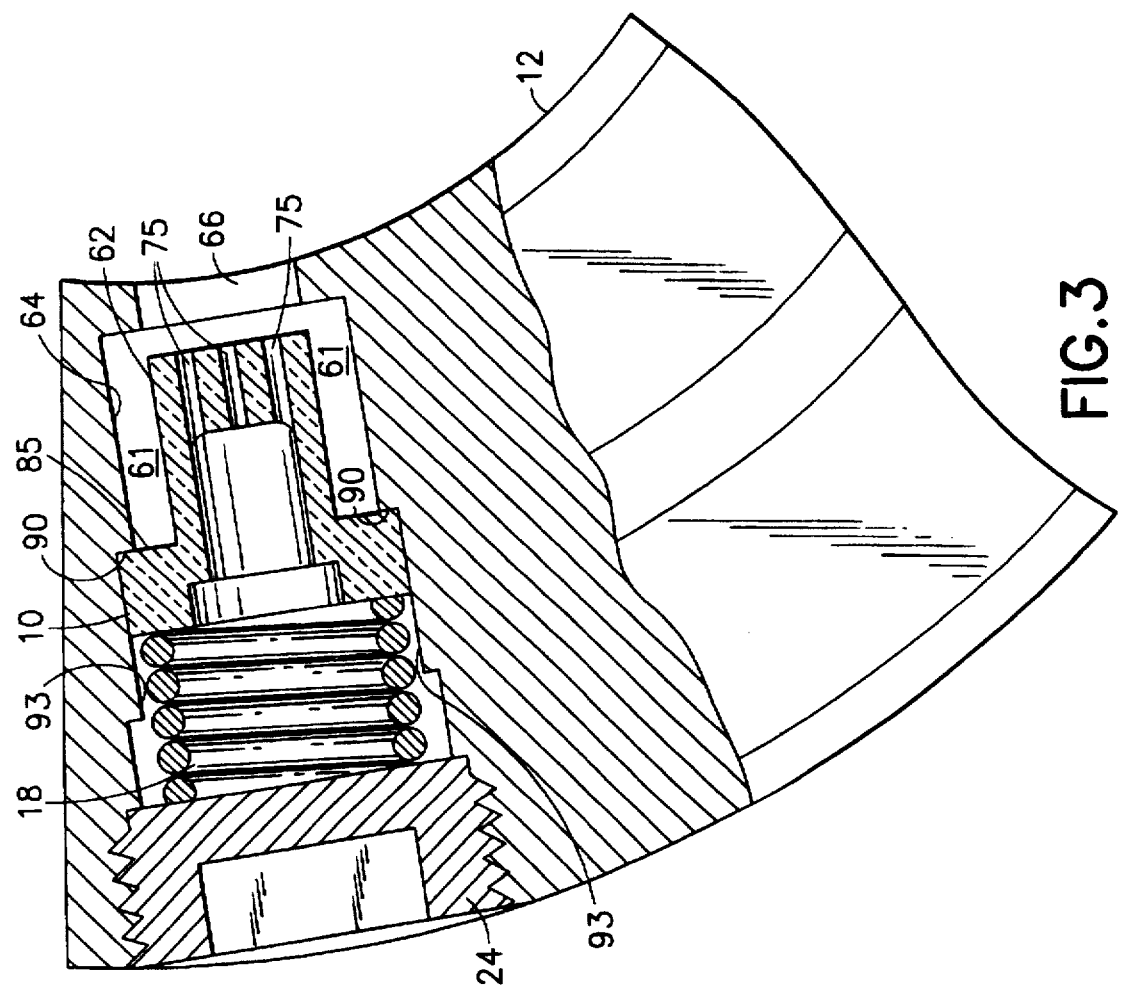
FIG. 3 is a cross sectional view of the burner taken along line 3—3 of FIG. 1.

An oxygen ($O_2$) supply line 40 is provided for connection to an oxygen fixture 42 of the burner head 12 for supplying oxygen to an oxygen channel 44 of the burner head 12. Similarly, a hydrogen (H$_2$) supply line 46 is provided for connection to a hydrogen fixture 48 of the burner head 12 for supplying hydrogen gas to a hydrogen gas channel 50 of the burner head 12. An aperture 54 is provided in the oxygen channel 44 for supplying oxygen to an area behind the nozzle 10 occupied by the spring 18. As will be described hereinafter, the oxygen exits the nozzle 10 via apertures formed in the nozzle 10. Similarly, an aperture 60 is provided in the hydrogen channel 50 for supplying hydrogen gas to an annular ring area 61 in front of the nozzle 10. Referring to FIG. 3, the external diameter of a front end 62 of the quartz nozzle 10 is less than the internal diameter of a front end 64 of the threaded aperture 14, thereby forming the annular ring area 61 around the front of the quartz nozzle 10. The hydrogen gas fills this area 61 and exits the burner through a gas outlet aperture 66 which is formed in the burner head 12 in front of the quartz nozzle 10. In the gas outlet aperture 66, the hydrogen gas mixes with the oxygen gas exiting apertures 75 formed in the quartz nozzle 10, as will be described in greater detail hereinafter.

Referring to FIGS. 4, 5 and 6, the quartz nozzle 10 is cylindrical in shape having a seating and alignment section 70 and a gas supply aperture section 72. The outside diameter of the seating and alignment section 70 is larger than the outside diameter of the gas supply aperture section 72. A plurality of gas supply apertures 75 are formed through an end of the gas supply aperture section 72 in communication with a gas supply chamber 80 formed in the nozzle 10. Therefore, when gas is supplied to the area behind the quartz nozzle 10, the gas fills the chamber 80 and exits the nozzle through the gas supply apertures 75. A machined seating surface 85 is formed on the seating and alignment section 70 of the nozzle 10 opposite the rear surface 20 of the nozzle 10. When installed in the aperture 14 as illustrated in FIG. 3, the seating surface 85 engages a machined seating surface 90 of the aperture 14 to provide a seal, thereby preventing gases from going around the quartz nozzle 10 between the aperture 14 and the nozzle 10 and forcing high pressure gases applied to the rear surface 20 and chamber 80 of the nozzle 10 to exit the nozzle through the gas supply apertures 75.

An outside diameter 92 of the seating and alignment section 70 is slightly less than an inside diameter 93 (FIG. 3) of the corresponding area within the aperture 14 to allow for differences in thermal expansion and contraction between the burner head 12 and the nozzle 10. This is to prevent possible fracture of the quartz nozzle 10 due to extreme compression because of the differences in thermal expansion between the nozzle 10 and the burner head 12.

Referring to FIGS. 3 and 6, firm and secure contact between the seating surface 85 of the quartz nozzle 10 and the seating surface 90 of the burner head aperture 14 (FIG. 1) is maintained by the spring pressure of the spring 18. Additionally, firm contact between the seating surfaces 85, 90 is maintained by the pressure of the oxygen gas applied to the rear surface 20 of the quartz nozzle 10.

A length 95 of the seating and alignment section 70 is selected to maintain proper axial alignment of the quartz nozzle 10 and gas supply apertures 75 with the gas outlet aperture 66 formed in the gas burner 12. This arrangement will provide for the proper trajectory of oxygen gas exiting the gas supply apertures 75 through the gas outlet aperture 66 formed in the burner 12. The velocity of the oxygen gases exiting the gas supply apertures 75 is determined by the pressure of oxygen gas applied to the gas supply apertures 75 and also based on the diameter of the gas supply apertures 75. The combination of pressure and oxygen supply aperture diameter is selected to provide a desired gas flow rate. Hydrogen gas will also exit the gas outlet aperture 66 formed in the burner 12 based on the higher pressure of hydrogen gas in the annular ring area 61.

Referring to FIGS. 2 and 3, during operation of the gas burner 12, high pressure oxygen is supplied via the oxygen supply line 40, oxygen channel 44 and aperture 54 to the rear of the quartz nozzle 10. Similarly, high pressure hydrogen gas is provided via the hydrogen gas line 46 and hydrogen channel 50 and aperture 60 to the annular ring area 61. Oxygen gas exits the gas supply apertures 75, mixes with the hydrogen gas in the area in front of the nozzle 10, and the gas mixture exits the gas burner via the gas outlet aperture 66. Once the mixture of hydrogen and oxygen gas is ignited, a high temperature heat source is provided for heating a preform or for performing a sleeving process. During operation, erosion of the quartz nozzle 10 may occur. However, the by-product from erosion of the quartz nozzle 10 is silicon dioxide, (SiO$_2$), which does not cause contamination of the fiber and associated weak points were future fractures or failure of the fiber may occur.

To increase the operating life of the quartz nozzle 10 and to minimize the chances of nozzle failure, the quartz nozzle 10 is flame polished to provide a smooth surface. As is well known in the art, such a smooth surface minimizes locations for the initiation of stress fractures. Additionally, the quartz nozzle 10 may be annealed for stress relief.

The invention is described and illustrated with respect to a half-shell ring burner 12 having six quartz nozzles 10 of the present invention installed therein. However, it will be understood by those skilled in the art that the quartz nozzles 10 of the present invention may be used with any fixed head configuration which was previously used with stainless steel nozzles.

Although the invention has been described and illustrated with respect to exemplary embodiments thereof, it will be understood by those skilled in the art that the foregoing and various other changes and omissions may be made therein and thereto without departing from the spirit and scope of the present invention.

What is claimed is:

1. A gas burner (13), comprising:
   a fixed burner head (12) made of a first material with a thermal expansion property, having annular walls forming a seating surface (90) and defining an inner chamber having a front area with a first aperture (44) for receiving a first gas and having a back area with a second aperture (54) for receiving a second gas, the fixed burner head (12) having an opening (14), and having a gas outlet aperture (66) for supplying a mixture of the first gas and the second gas;
   a non-metallic nozzle (10) made of a second material having a different thermal expansion property than the thermal expansion property of the first material, and being arranged in the inner chamber of the fixed burner head (12), having a seating surface (85) for contacting the seating surface (90) of the fixed burner head (12) for separating the front area of the inner chamber from the back area of the inner chamber, having gas supply apertures (75), and having a chamber (80) for providing the first gas from the front area of the inner chamber to the gas supply apertures (75);
   an end cap (24) for detachably affixing in the opening of the fixed burner head (12); and
   elastic means (18) arranged between the end cap (24) and the non-metallic quartz nozzle (10) for applying an axial force to maintain a seal between the seating surface (85) of the quartz nozzle (10) and the seating surface (90) of the fixed burner head (12) and also for allowing the first gas to pass from the first aperture (44) of the fixed burner head (12) to the chamber (80) of the non-metallic quartz nozzle (10).

2. A gas burner (13) according to claim 1, wherein the elastic means (18) arranged between the end cap (24) and the non-metallic nozzle (10) is a spring (18).

3. A gas burner (13) according to claim 1, wherein the non-metallic nozzle (10) is a quartz nozzle.

4. A gas burner (13) according to claim 1, wherein the non-metallic nozzle (10) is a machined quartz nozzle.

5. A gas burner (13) according to claim 1, wherein the non-metallic nozzle (10) is flame polished and annealed.

6. A gas burner (13) according to claim 1, wherein the size of the gas supply apertures (75) are selected to provide a desired flow rate of the first gas therethrough.

7. A gas burner (13), comprising:

a fixed burner head (12) made of a first material with a thermal expansion property, having annular walls forming a machined seating surface (90) and defining an inner chamber having a front area with a first aperture (44) for receiving a first gas and having a back area with a second aperture (54) for receiving a second gas, the fixed burner head (12) having a threaded aperture (14) with threads (26), and having a gas outlet aperture (66) for supplying a mixture of the first gas and the second gas;

a quartz nozzle (10) made of a second material having a different thermal expansion property than the thermal expansion property of the first material, being arranged in the inner chamber of the fixed burner head (12), having a seating surface (85) for contacting the machined seating surface (90) of the fixed burner head (12), having gas supply apertures (75), and having a chamber (80) for channeling the first gas to the gas supply apertures;

an end cap (24) having threads (30) for screwing into the threads (26) of the threaded aperture of the fixed burner head (12); and a spring (18) arranged between the end cap (24) and the quartz nozzle (10) for applying a spring force to maintaining pneumatic seal between the seating surface (85) of the quartz nozzle (10) and the machined seating surface (90) of the fixed burner head (12) and for allowing the first gas to pass from the first aperture (44) of the fixed burner head (12) to the chamber (80) of the quartz nozzle (10).

8. A gas burner (13) according to claim 7, wherein the quartz nozzle (10) is made from a machined quartz.

9. A gas burner (13) according to claim 7, wherein the quartz nozzle (10) is flame polished and annealed.

10. A gas burner (13) according to claim 7, wherein the size of the gas supply apertures (75) are selected to provide a desired flow rate of the first gas therethrough.

* * * * *